United States Patent [19]

Taniguchi

[11] 4,352,737

[45] Oct. 5, 1982

[54] STRAINER FOR AUTOMATIC TRANSMISSION CONTROL VALVE

[75] Inventor: Takuji Taniguchi, Okazaki, Japan

[73] Assignee: Aisin Warner Kabushiki Kaisha, Anjo, Japan

[21] Appl. No.: 187,127

[22] Filed: Sep. 15, 1980

[30] Foreign Application Priority Data

Sep. 19, 1979 [JP] Japan ................................. 54-129671

[51] Int. Cl.$^3$ .............................................. B01D 35/02
[52] U.S. Cl. ..................................... 210/455; 210/482; 210/168
[58] Field of Search ..................... 210/168, 416.5, 455, 210/451, 482, 477

[56] References Cited

U.S. PATENT DOCUMENTS

| 3,056,501 | 10/1967 | Thorman et al. | 210/168 X |
| 3,400,824 | 10/1968 | Weimen et al. | 210/477 X |
| 3,784,011 | 1/1974 | Ward | 210/168 |
| 4,129,503 | 12/1978 | Joseph | 210/455 |
| 4,136,011 | 1/1979 | Joseph | 210/168 |

Primary Examiner—John Adee
Attorney, Agent, or Firm—Blum, Kaplan, Friedman, Silberman & Beran

[57] ABSTRACT

A strainer for use on a valve body of an automatic transmission includes an enlarged filter area and is located in an oil pan under the valve body. A strainer divides the oil pan into upper and lower chambers and has a central tube connected with a suction port of the valve body. Fluid discharged into the upper chamber of the oil pan flows down to the lower chamber through the enlarged filtering area of the strainer and is sucked into the valve body through the centrally located tube.

8 Claims, 4 Drawing Figures

STRAINER FOR AUTOMATIC TRANSMISSION CONTROL VALVE

BACKGROUND OF THE INVENTION

This invention relates to a fluid filtering device and more particularly to a strainer construction for use in a automatic transmission for filtering oil which is circulated in the transmission as pressure transmitting and lubricating media. The oil is usually provided in a reservoir or oil pan located beneath a control valve body of the automatic transmission. The oil is sucked into the valve body serving as the input supply to a hydraulic control system of the transmission. Filtration through an oil strainer is provided prior to the entrance of the oil into the valve body.

The oil strainer removes particles of foreign matter which otherwise cause seizure or sticking of valves in time in the hydraulic control system. In this regard, it is the general practice in the prior art to provide an oil strainer at the entrance of the suction passage to the valve body. Thus, the oil strainer has a small filtering area when compared with the volume of the oil pan and the rate of oil flow through the suction inlet passage to the valve body. Therefore, the strainer is susceptible to early clogging. Replacement of the strainer is not a simple task.

Clogging of the oil strainer creates an increase in resistance to oil flow from the oil pan to the valve body and makes it difficult to maintain a rated oil pressure and rated flow quantities in the hyraulic control system of the transmission. Failure or improper operation of the transmission may result.

What is needed is strainer means able to assure rated oil flows to the valve body over extended periods of time without servicing.

SUMMARY OF THE INVENTION

Generally speaking, in accordance with the invention, a strainer construction especially suited for an automatic transmission control valve is provided. The strainer for use on a valve body of the automatic transmission includes an enlarged filter area and is located in the oil pan under the valve body. The strainer divides the oil pan into upper and lower chambers and has a tube connected with a suction port of the valve body. The fluid discharges to the upper chamber of the oil pan from the transmission, flows down to the lower chamber through the enlarged filtering area of the strainer and is sucked into the valve body through the centrally located tube.

The strainer includes a frame located parallel with and at a predetermined distance from the bottom surface of the oil pan. The tube has its lower end supported on the frame and opening into the lower chamber of the oil pan and the upper end of the tube fits into the suction port of the valve body.

Accordingly, it is an object of this invention to provide an improved strainer construction for an automatic transmission control valve having a substantially enlarged filter area provided in a conventional oil pan construction.

Another object of this invention is to provide an improved strainer construction for an automatic transmission control valve which has low pressure drop and requires a minimum of service to maintain rated flows of fluid.

A further object of this invention is to provide an improved strainer construction for an automatic transmission control valve wherein the strainer divides the oil pan into upper and lower chambers so that flow velocities through the strainer are reduced.

Still another objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
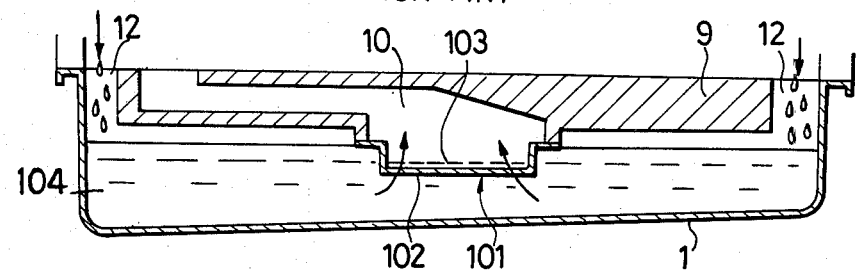
FIG. 1 is a sectional view in elevation of a conventional oil strainer of the prior art.

FIG. 1 illustrates a conventional oil strainer 101 of the prior art which is in current usage on automatic transmissions. The strainer 101 includes a frame 102 which is attached to an oil suction port 10 of a valve body 9. The frame 102 has openings therethrough for a flow of oil from an oil pan 1 positioned in fixed relationship to the valve body 9 by fastening means (not shown). The frame 102 is submerged beneath the surface of the oil 104 in the pan 1. A screen mesh 103 rests on top of the frame 102 such that oil 104 drawn into the valve body 9 through the oil suction port 10 must flow through the base of the frame 102 and the screen mesh 103. The flow area of the screen 103 is small relative to the surface area of oil 104 in the pan 1 and in relation to the flow rates of oil passing through the screen mesh 103. Accordingly, the time elapsed in operation before the filter becomes obstructed with foreign matter from the automatic transmission to which the valve body 9 connects, is undesirably short. Draining the oil 104 and removal of the pan 1 is a messy, time-consuming job.

Figure 2:
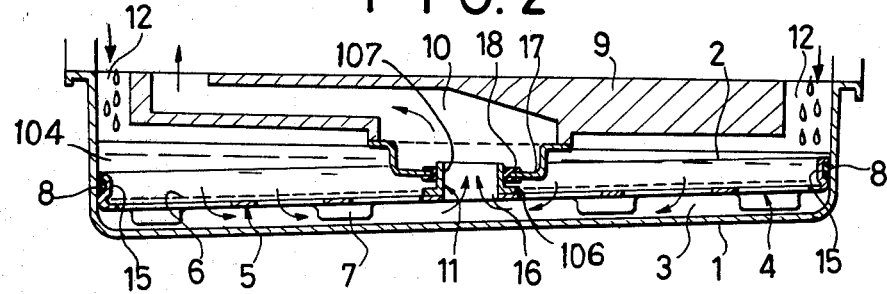
FIG. 2 is a section view in elevation of an oil strainer for an automatic transmission control valve in accordance with this invention.

FIG. 2 is a sectional view of a preferred embodiment in accordance with this invention in which the same reference numerals are used as in FIG. 1 to indicate common components. The strainer for an automatic transmission control valve in accordance with this invention includes a valve body 9 having an oil pan 1 attached to the lower end of the valve body and containing oil 104. The oil pan 1 and the valve body 9 are held in fixed positions relative to each other by fastening means (not shown). It should be noted that the valve body 9 and oil pan 1 of FIG. 2 are identical to the similar components 1, 9 of FIG. 1.

The oil pan 1 is divided into an upper chamber 2 and a lower chamber 3 by an oil strainer 4 which includes a frame 5 and a screen mesh 6 resting on top of the frame 5. Lower projection 7 extend downwardly from the frame 5 and maintain the frame 5 at a predetermined distance from the bottom surface of the oil pan 1. The frame 5 is contoured to fit within the oil pan 1 and is fixedly attached to the inner periphery of the oil pan 1 by means of a sealing material 8. Thus, oil flowing from the upper chamber 2 to the lower chamber 3 cannot bypass the screen mesh 6. A tubular body 11 is positioned at the center of the oil strainer 4 and connects the lower chamber 3 with the oil suction port 10 of the valve body 9. Oil discharge ports 12 from the automatic transmission connect with the upper chamber 2 of the oil pan 1 and oil 104 drips from the automatic transmission into the reservoir of oil 104 in the oil pan 1.

Figure 3:
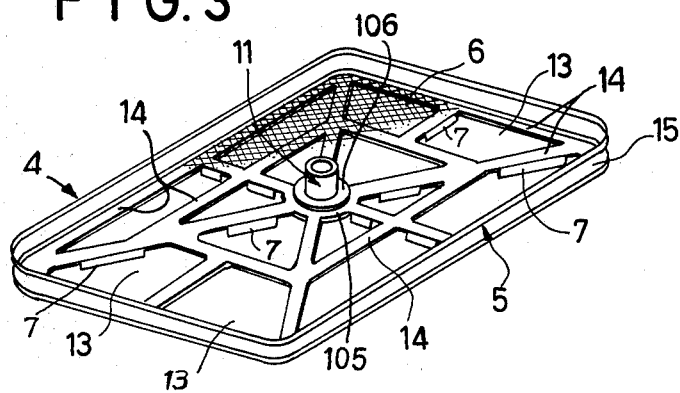
FIG. 3 is a top perspective view of a support frame of the strainer of FIG. 2.

As best seen in the perspective view of FIG. 3, the frame 5 includes a plate-like element having a plurality of punched openings 13 formed therein leaving reinforcing strips 14 between openings 13 for supporting the screen mesh 6. The screen mesh is formed of any suitable filter material as would be used in the strainers of the prior art. The frame 5 includes a skirt 15 extending substantially perpendicularly from the peripheral portion of the edge reinforcing strips 14. The peripheral skirt 15 has a C-shaped cross section as best seen in FIG. 2. Sealing material 8 is located in the hollow on the outer side of the C-shaped peripheral wall skirt 15 so that the joint between the oil strainer 4 and the oil pan 1 is made liquid tight by means of the seal material 8. The seal 8 cannot escape from the hollow of the C-shaped wall skirt 15.

The projections 7 which are integral with the reinforcing strips 14, are formed simultaneously with the punching operation for producing the openings 13 and are then bent downward to project to the underside of the frame 5. The tubular body 11 is a separate component from the frame 5 which is securely fitted in a hole 16 located in the center hub 105 of the frame 5. The hub 105 is produced in the punching operation for forming the openings 13. The screen mesh 6, as stated above, is formed in a shape similar to the frame 5 and provided with a center opening for receiving the tubular body 11 therethrough. The inner and outer peripheral edges of the screen mesh 6 are secured respectively to the outer peripheral skirt 15 of the frame 5 and a flange 106 extending parallel to the planar surface of the reinforcing strips 14. The connection between the screen mesh and the tubular body 11 and wall skirt 15 are made by soldering, welding or rubber seals. The height of the projections 7 sets the screen mesh 6 at a fixed distance from the bottom of the oil pan 1.

With reference to FIG. 2, a cup-shaped spacer 17 is connected to the opening of the suction passage 10 of the valve body 9. The spacer member 17 includes a centrally positioned aperture which is fitted to the tubular portion 107 of the tubular body 11. A seal member 18 attached to the spacer member 17 presses against the tubular portion 107 to provide a leak-tight connection. The connection between the tubular body 11 and the spacer member 17 is made before the oil pan 1 is secured to the valve body 9. Thus, the suction passage 10 connects only with the tubular body 11 through the center opening in the spacer member 17.

Oil from the hydraulic control system (not shown) of the automatic transmission is discharged into the oil pan 1 through the discharge port 12. More particularly, the oil is inputted into the upper chamber 2 and particles of foreign matter, if any, are filtered out before the oil enters the lower chamber 3. The cleaned oil in the lower chamber 3 is sucked through the tubular body 11 of the oil strainer 4, and through the suction passage 10 by a hydraulic pump (not shown) used for supplying fluid to a hydraulic control system. Thus, the oil strainer 4 extending to the entire pheriphery of the oil pan 1 provides a large filtering area for oil which is returned to the oil reservoir 104 from the automatic transmission through the discharge port 12.

Figure 4:
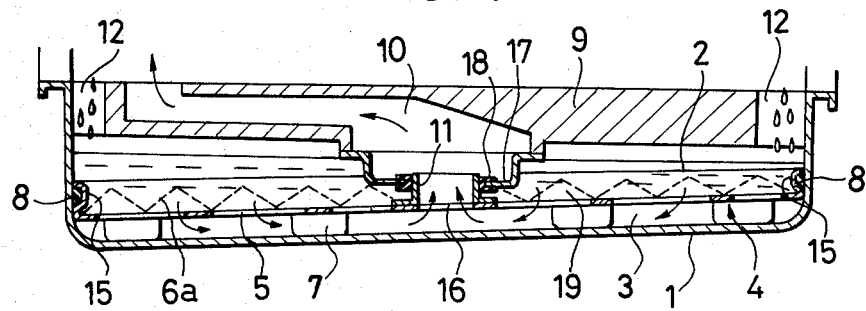
FIG. 4 is a sectional view in elevation of an alternative embodiment in accordance with the present invention.

FIG. 4 illustrates another embodiment of a strainer construction for an automatic transmission control valve in accordance with this invention. This embodiment is the same as the embodiment of FIG. 2 with the exception that a screen mesh 6a replaces the screen mesh 6 of FIG. 2. The screen mesh 6a is arranged in a zig-zag pattern as compared to the flat screen 6 of FIG. 2. The outer periphery of the screen mesh 6a is secured to the inner side of the peripheral wall skirt 15 through a seal member 19, fabricated of rubber or other suitable materials compatible with the oil so as to prevent a bypass oil flow. The seal member 19 is sufficiently high to cover both the upper and lower apexes in the zig-zag pattern of the screen mesh 6a. The zig-zag arrangement of the screen mesh 6a provides a greater filtering area for the same flow face area as compared with the embodiment of FIG. 2. Therefore, the strainer of FIG. 4 is expected to have a longer operating life before maintenance is required.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A strainer construction for use on an automatic transmission control valve body, comprising:
   a tray-like oil pan attached to the lower end of said valve body;
   a strainer including a filter material and a frame for holding said filter material thereon;
   said frame including a plate-like element having a plurality of openings therethrough, lower projections formed integrally therefrom for holding the frame at a predetermined distance from the bottom surfaces of said oil pan and a peripheral skirt extending therefrom being fitted to the inner periphery of said oil pan and dividing the inner space of said oil pan into upper and lower chambers;
   seal means hermetically securing said peripheral skirt to said inner periphery of said oil pan; and
   a tubular body having an upper end attached to a suction port of said valve body and a lower end connected to said frame,
   the only flow communication between said upper and lower chambers being through said strainer and the flow area of said strainer substantially equals the length-by-width area of said oil pan.

2. A strainer construction as claimed in claim 1, and further comprising a spacer member fixed to said suction port of said valve body, the upper end of said tubular body being fixed to said spacer member.

3. A strainer construction as claimed in claim 1, wherein said strainer comprises a filter material arranged in a zig-zag pattern and a frame for securely holding in position the marginal edges of said filter material.

4. In an automatic transmission including a valve body, an oil pan for controlling a reservoir of oil, and an oil inlet to said reservoir, said valve body having an oil suction port for intake of oil from said reservoir, the improvement therein comprising:

filter means within said oil pan between said inlet and said suction port, said filter means being at least in part submerged in said oil reservoir and extending beyond said oil suction port to the side walls of said oil pan, and dividing said oil pan into upper and lower chambers, said submerged part of said filter means having an opening therethrough;

support means for holding said filter means in position in said oil pan comprising a frame including a plate-like element having a plurality of openings therethrough, lower projections formed integrally with and extending from said frame for holding said frame at a predetermined distance from the bottom surface of said oil pan and a peripheral skirt extending from peripheral portion thereof;

sealing means provided between said peripheral skirt of said frame and the inner periphery of said oil pan; and connecting means for passage of oil therethrough from said reservoir through said submerged opening in said filter means to said valve body suction port, oil from said oil inlet flowing through said filter means to reach said connecting means, whereby an extended filter area is provided for oil flowing to said oil suction port.

5. An automatic transmission as claimed in claim 4, wherein said connecting means comprises a duct sealingly joined at one end to the periphery of said opening in said filter means and at the other end to said suction port.

6. An automatic transmission as claimed in claim 4, wherein said filter means is substantially planar and horizontal.

7. An automatic transmission as claimed in claim 4, wherein said filter means is substantially planar and zig-zag is cross section.

8. An automatic transmission as claimed in claim 4 or 5, wherein said oil inlet to said pan is above said filter means, whereby oil flows downward through said filter means and upward through said connecting means to said valve body.

* * * * *